US 6,592,385 B1

(12) United States Patent
Chen

(10) Patent No.: US 6,592,385 B1
(45) Date of Patent: Jul. 15, 2003

(54) CARD EJECTION MECHANISM FOR ELECTRONIC CARD CONNECTOR

(75) Inventor: Ming-Ching Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/101,292

(22) Filed: Mar. 18, 2002

(30) Foreign Application Priority Data

Dec. 26, 2001 (TW) ........................................ 90222977U

(51) Int. Cl.[7] ............................................... H01R 13/62
(52) U.S. Cl. ........................................ 439/159; 439/188
(58) Field of Search ................................. 439/159, 160, 439/152, 188, 155

(56) References Cited

U.S. PATENT DOCUMENTS 6,042,401 A * 3/2000 Oguchi et al. ............. 439/159
6,332,791 B1 * 12/2001 Wang et al. ............... 439/159

* cited by examiner

*Primary Examiner*—Tho D. Ta
(74) *Attorney, Agent, or Firm*—Wei Te Chung

(57) ABSTRACT

An ejection mechanism for an electronic card connector includes a guiding structure (20), a lid (22), a slide rod (24), a slide block (26), an elastic element (27) and a retaining assembly (28). The guiding structure is formed in a housing of the connector. The guiding structure includes a recess (201) and an arcuate island (200) formed in a middle of the recess. A protrusion (144) is formed by the housing and protrudes in the recess. A second end (244) of the slide rod is slidably fitted in the recess.

9 Claims, 10 Drawing Sheets

CARD EJECTION MECHANISM FOR ELECTRONIC CARD CONNECTOR

CROSS-REFERENCE TO RELATED APPLICATION

This application is a co-pending application of patent application Ser. No. 10/101,299 filed on Mar. 18, 2002, entitled ELECTRONIC CARD CONNECTOR AND METHOD FOR ASSEMBLING SAME, invented by the same inventor and assigned to the same assignee of this application. The disclosure of the related application is wholly incorporated herein by reference.

BACKGROUND OF THE INVENTION

1. Field of the Invention

The present invention relates to electronic card connectors, and more particularly to a card ejection mechanism for an electronic card connector which has a guiding structure with a generally sea horse shaped contour.

2. Prior Art

As electronics technology advances, electronic cards are being more widely used with electronic devices such as mobile phones, personal computers, notebooks, and personal digital assistants (PDAs). Electronic card connectors are adapted to connect electronic cards with the electronic devices, so that processing units in the devices can access information stored in the electronic cards. The electronic card may be removed and replaced with another electronic card; for example, when a different user wants to have access to the same electronic device. Card ejection mechanisms are thus used in the connectors for allowing convenient manual changeover of electronic cards when required.

An example of a conventional card connector is disclosed in Japan Patent Application No. 2000-2664. With reference to FIG. 1, the conventional card connector comprises an upper housing (not shown), a lower housing 14', a plurality of contacts (not shown), and a card ejector 2'. The card ejector 2' includes a spring 27', a slide arm 26', and a slide lever 24' attached to the slide arm 26'. A heart-shaped block 200' and a corresponding heart-shaped groove 201' surrounding the block 200' are formed in the slide arm 26'. The block 200' has a pit portion 203' and a tip portion 202'. The slide lever 24' has an upper end 242' and a lower end 244'. In operation of the ejector, the lower end 244' of the slide lever 24' slides in the groove 201'. When a card (not shown) is fully inserted into the connector, the lower end 244' engages in the pit portion 203'. When the slide arm 26' is pushed, the lower end 244' exits the pit portion 203', and the spring 27' pushes the slide arm 26' rearward to drive the inserted card to also move rearward. Thus, the inserted card is ejected from the connector. However, the heart-shaped block 200' and the corresponding heart-shaped groove 201' in the slide arm 26' cannot effectively position the slide lever 24' in a desired position. Therefore the heart-shaped block 200' and the heart-shaped groove 201' occupy an unduly large width.

SUMMARY OF THE INVENTION

An object of the present invention is to provide a card ejection mechanism for an electronic card connector that occupies a relative small space and offers a stable engagement between the ejection mechanism and the card connector.

To accomplish the above-mentioned object, an ejection mechanism for an electronic card connector includes a guiding structure, a lid, a slide rod, a slide block, an elastic element and a retaining assembly. The guiding structure is formed in a housing of the connector. The guiding structure includes a recess and an arcuate island formed in a middle of the recess. A protrusion is formed by the housing and protrudes in the recess. A second end of the slide rod is slidably fitted in the recess.

Further objects and advantages of the present invention will become more apparent from a consideration of the drawings and the following detailed description.

DETAILED DESCRIPTION OF THE PREFERRED EMBODIMENT

Figure 1:
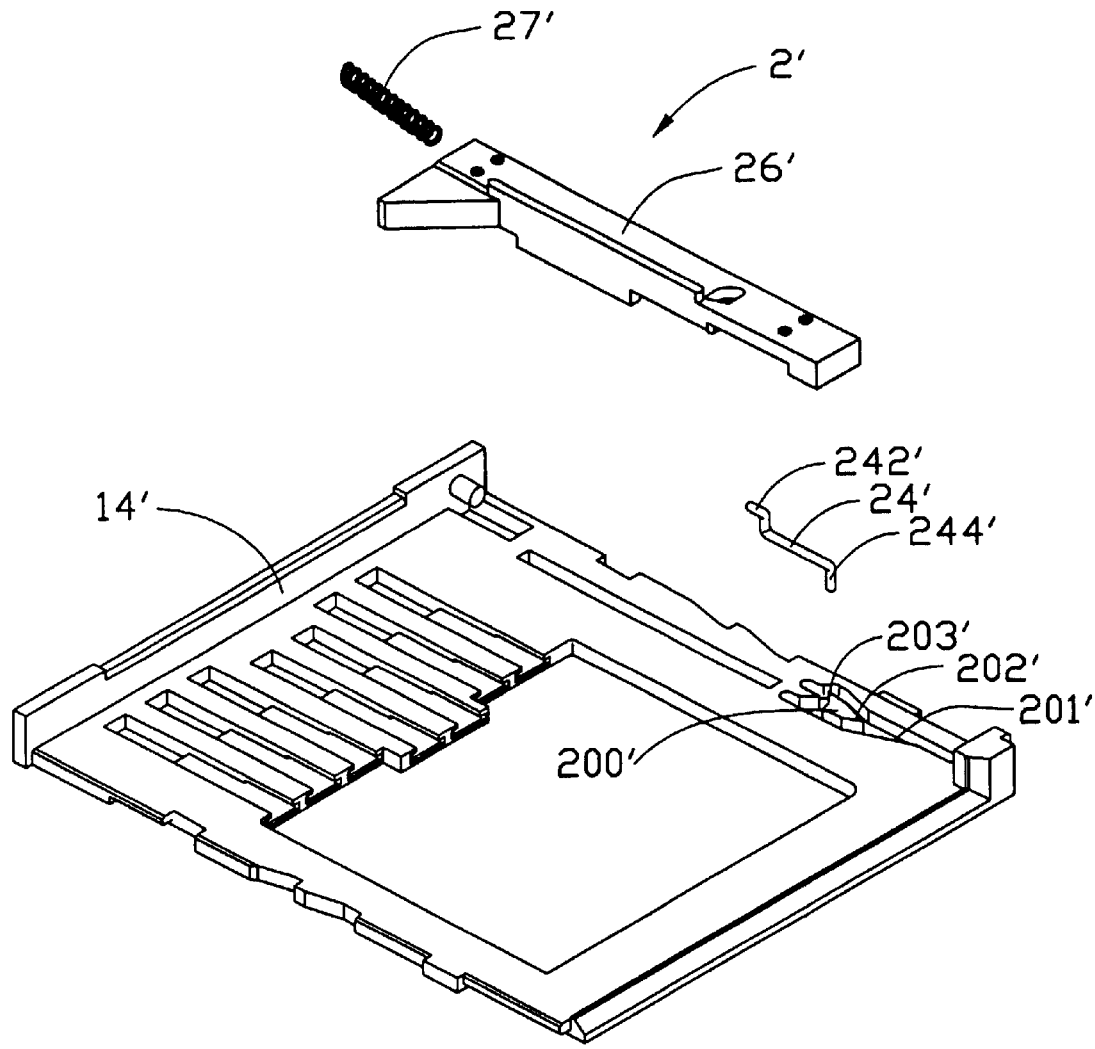
FIG. 1 is an exploded perspective view of a part of a conventional card connector.
Figure 2:
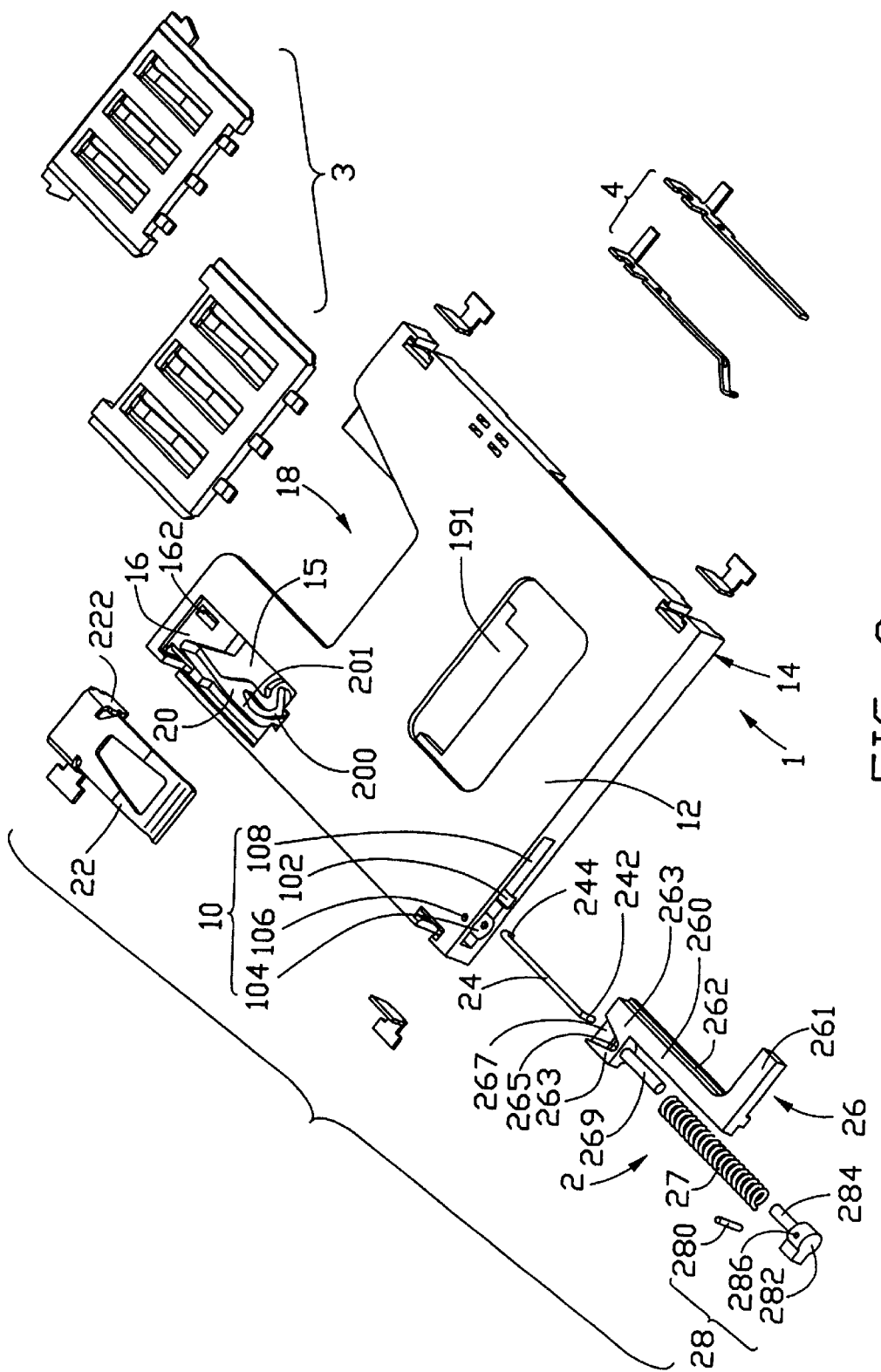
FIG. 2 is an exploded perspective view of an electronic card connector in accordance with the present invention.
Figure 3:
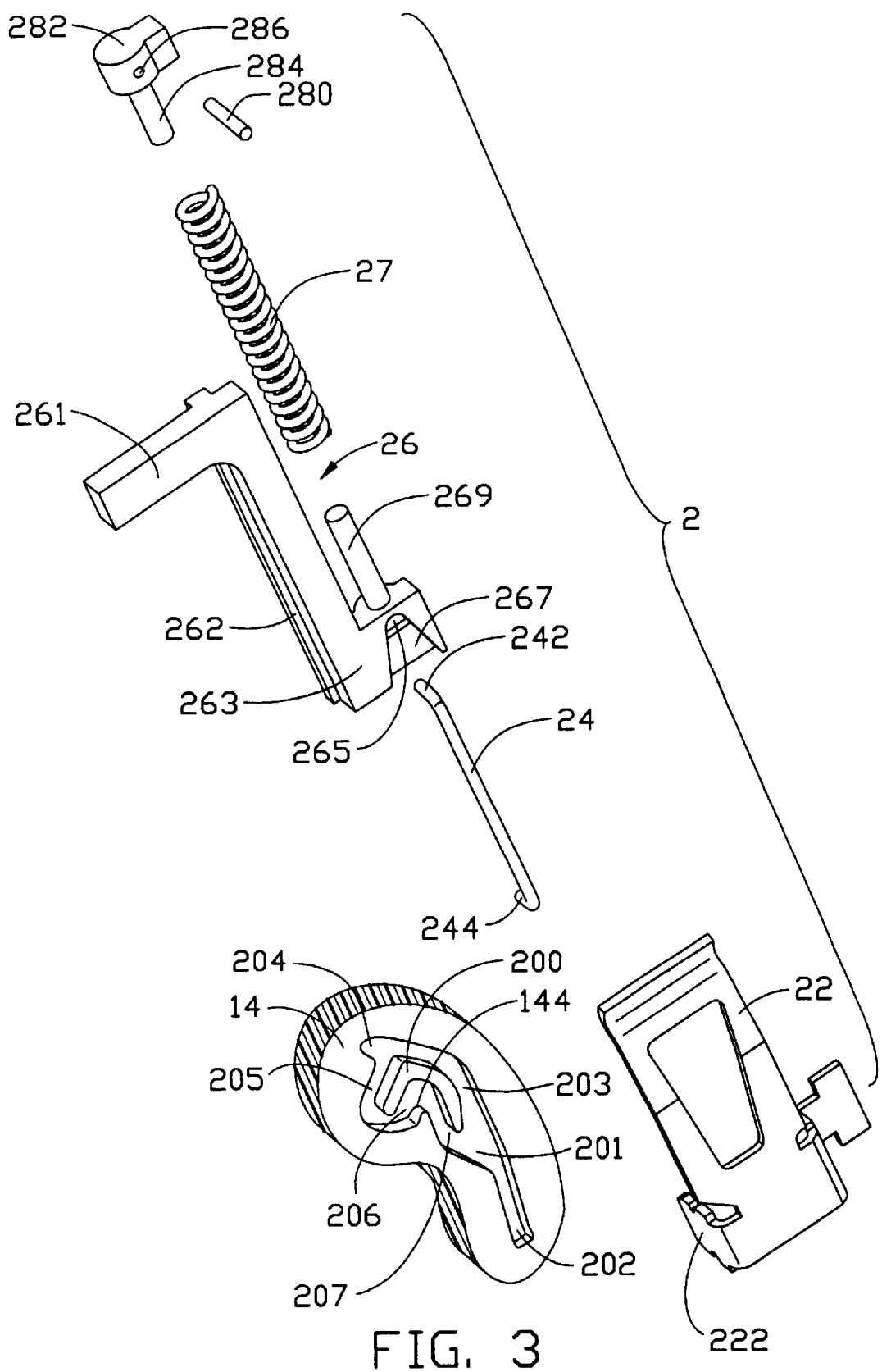
FIG. 3 is an exploded perspective view of a card ejection mechanism of the card connector of FIG. 2.

The present invention will now be introduced in detail by referring to the accompanying drawings. Referring to FIGS. 2 and 3, an electronic card connector comprises an insulative housing 1, an ejection mechanism 2, a contact module 3 and a detecting device 4.

The housing 1 comprises a top wall 12, a bottom wall 14, a receiving cavity 10, a top opening 15, and a receiving space 18 for receiving an electronic card. The top opening 15 is defined in a corner of the top wall 12. A stage 16 is formed in the top opening 15. A slot 162 is defined in the stage 16. A bottom opening 191 is defined in a middle portion of the bottom wall 14, for receiving the contact module 3. The receiving cavity 10 is for accommodating the ejection mechanism 2 at a position adjacent a lateral side of the housing 1. The receiving cavity 10 comprises a guiding groove 102, a first receiving groove 104, a first through hole 106, and a second receiving groove 108. The first through hole 106 is defined in the housing 1 above and below the first receiving groove 104, and in communication with the first receiving groove 104.

The ejection mechanism 2 includes a guiding structure 20, a lid 22, a slide rod 24, a slide block 26, an elastic element 27, and a retaining assembly 28.

The guiding structure 20 is formed in the bottom wall 14 of the housing 1. The guiding structure 20 includes a recess 201 defined in the bottom wall 14, and an arcuate island 200 formed in a middle of the recess 201. In this embodiment, the recess 201 has a generally sea horse shaped contour. In cooperation with the island 200, the recess 201 comprises the following portions: a tail portion 202, a back portion 203, a top portion 204, a face portion 205, a jaw portion 206, and an abdomen portion 207. The top portion 204 is disposed between and in communication with the back portion 203 and the face portion 205. The bottom wall 14 also forms a protrusion 144 protruding into the jaw portion 206 adjacent the abdomen portion 207 and opposite the island 200.

The lid 22 is used to cover the guiding structure 20 when they are assembled into the housing 1. The lid 22 includes a position tab 222 for inserting into the slot 162 of the housing 1, and a solder pad (not labeled) for soldering to a printed circuit board (PCB) on which the connector is mounted. Three independent solder pads (not labeled) are for mounting to lateral sides of the housing 1.

The slide rod 24 has a first end 242 and a second end 244. Both ends 242, 244 are bent downwardly, with the second end 244 being for movably fitting in the recess 201 of the housing 1.

The slide block 26 has a generally Z-shaped configuration. The slide block 26 includes a support arm 260 forming a flange 262, a resisting arm 261 perpendicularly extending from a rear end of the support arm 260 in a first direction, and a fixing arm 263 perpendicularly extending from a front end of the support arm 260 in a second direction that is opposite to the first direction. A fixing opening 265 is defined in the fixing arm 263, and a fixing portion 267 of the fixing arm 263 is thus formed adjacent the fixing opening 265. A first engaging pin 269 extends rearward from the fixing arm 263, parallel to the support arm 260.

The elastic element 27 is preferably a helical compression spring, a front end of which is for engaging with the first engaging pin 269 of the slide block 26.

The retaining assembly 28 is used to fix the ejection mechanism 2 in the housing 1. The retaining assembly 28 includes a locking pin 280, a base portion 282 defining a second through hole 286, and a second engaging pin 284 for engaging with a rear end of the elastic element 27.

The contact module 3 comprises two contact elements. Each contact element has three contacts (not labeled) for transmitting electronic signals between an electronic card inserted into the connector and a mainframe incorporating the connector. The detecting device 4 comprises two contacts for detecting whether the electronic card is fully inserted into the connector. The detecting device 4 is conventional, and further description thereof is omitted herefrom for brevity.

Figure 4:
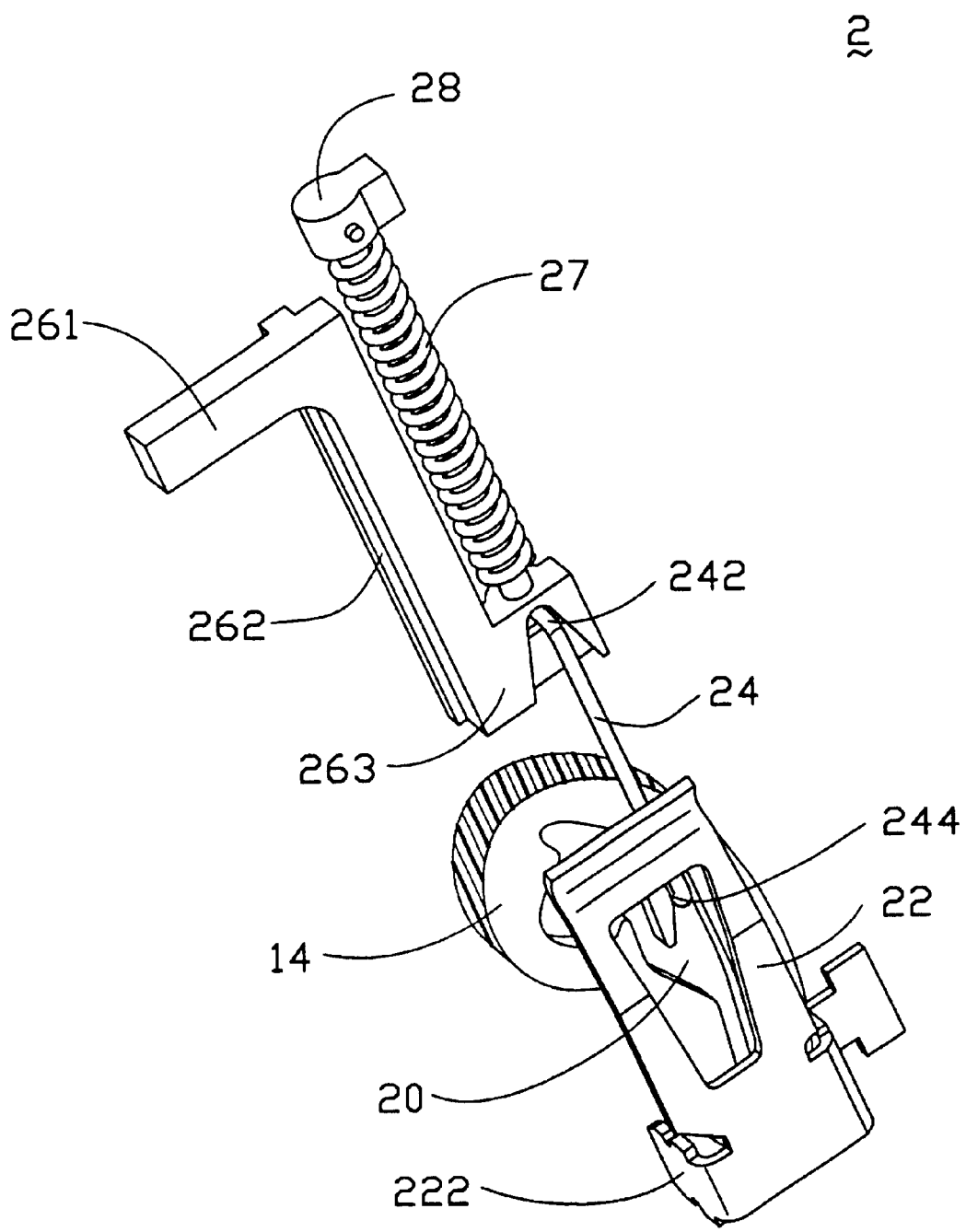
FIG. 4 is an assembled view of FIG. 3.

FIG. 4 shows the ejection mechanism 2 fully assembled. Assembly of the ejection mechanism 2 is well known by those skilled in the art, therefore a detailed description thereof is omitted herefrom.

Figure 5:
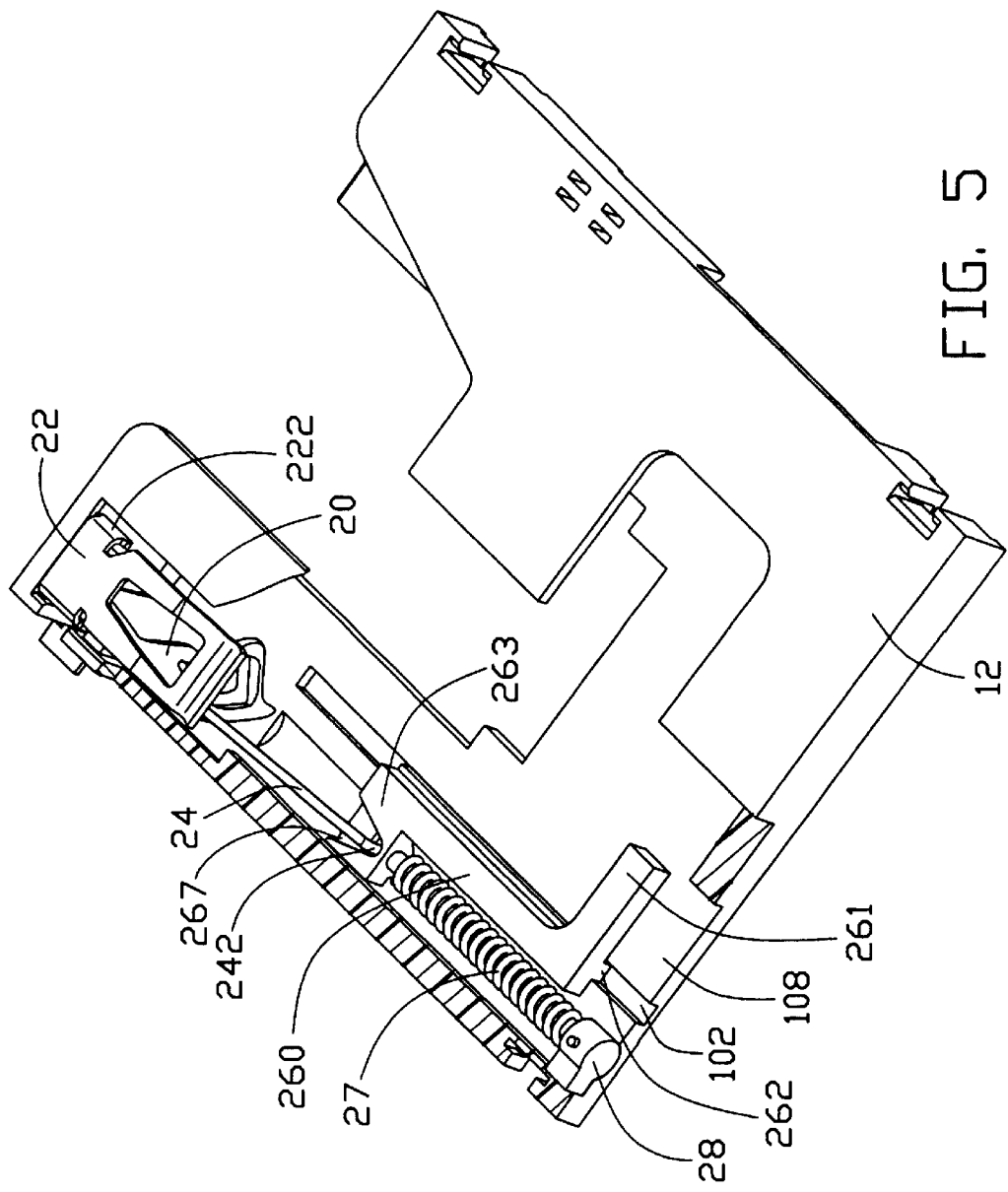
FIG. 5 is an assembled view of FIG. 2.
Figure 6:
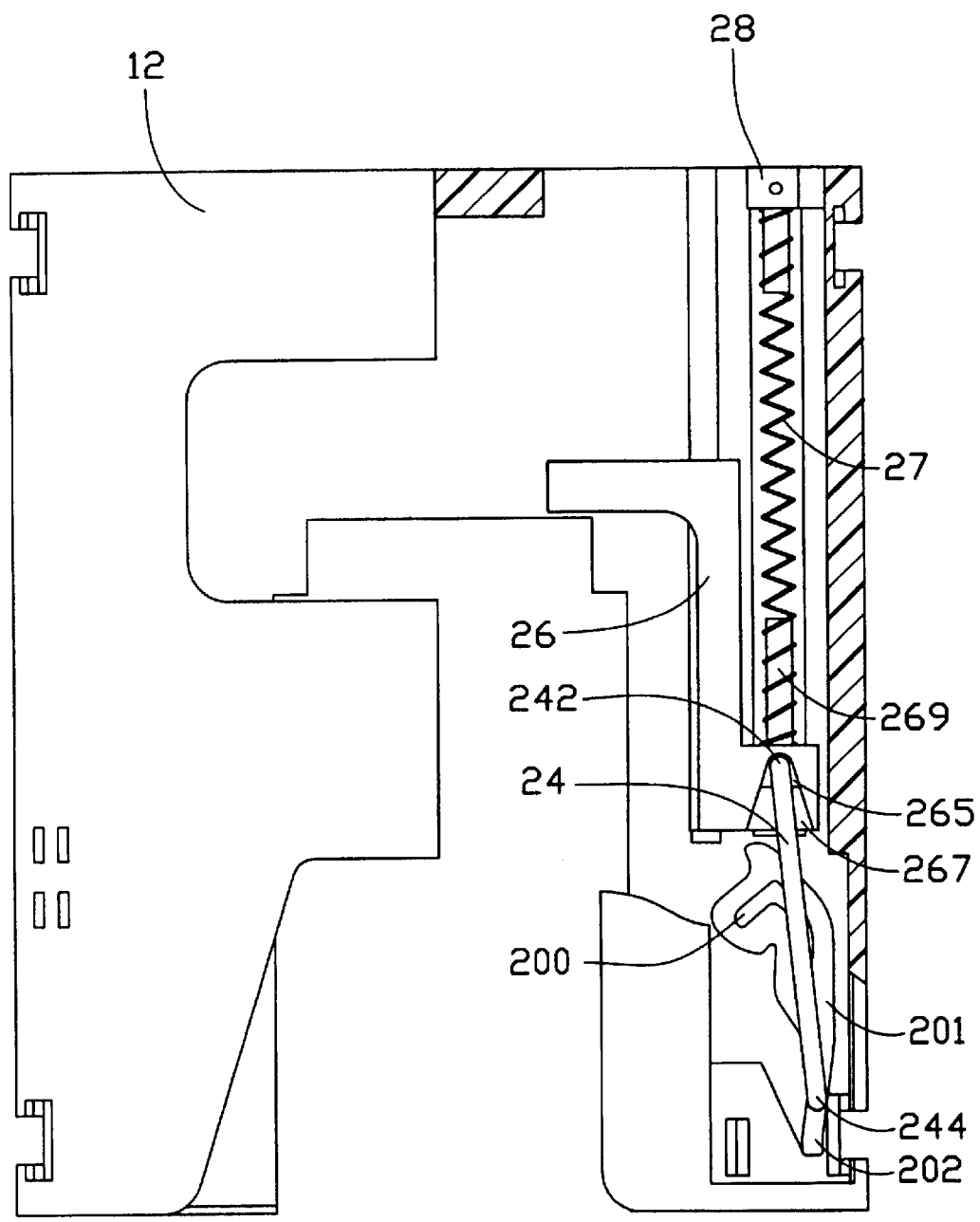
FIGS. 6–10 are top plan views of the card connector of FIG. 2, sequentially showing a track of an end of a slide rod sliding in a recess of the card ejection mechanism of the card connector when the card ejection mechanism is in operation.
Figure 7:
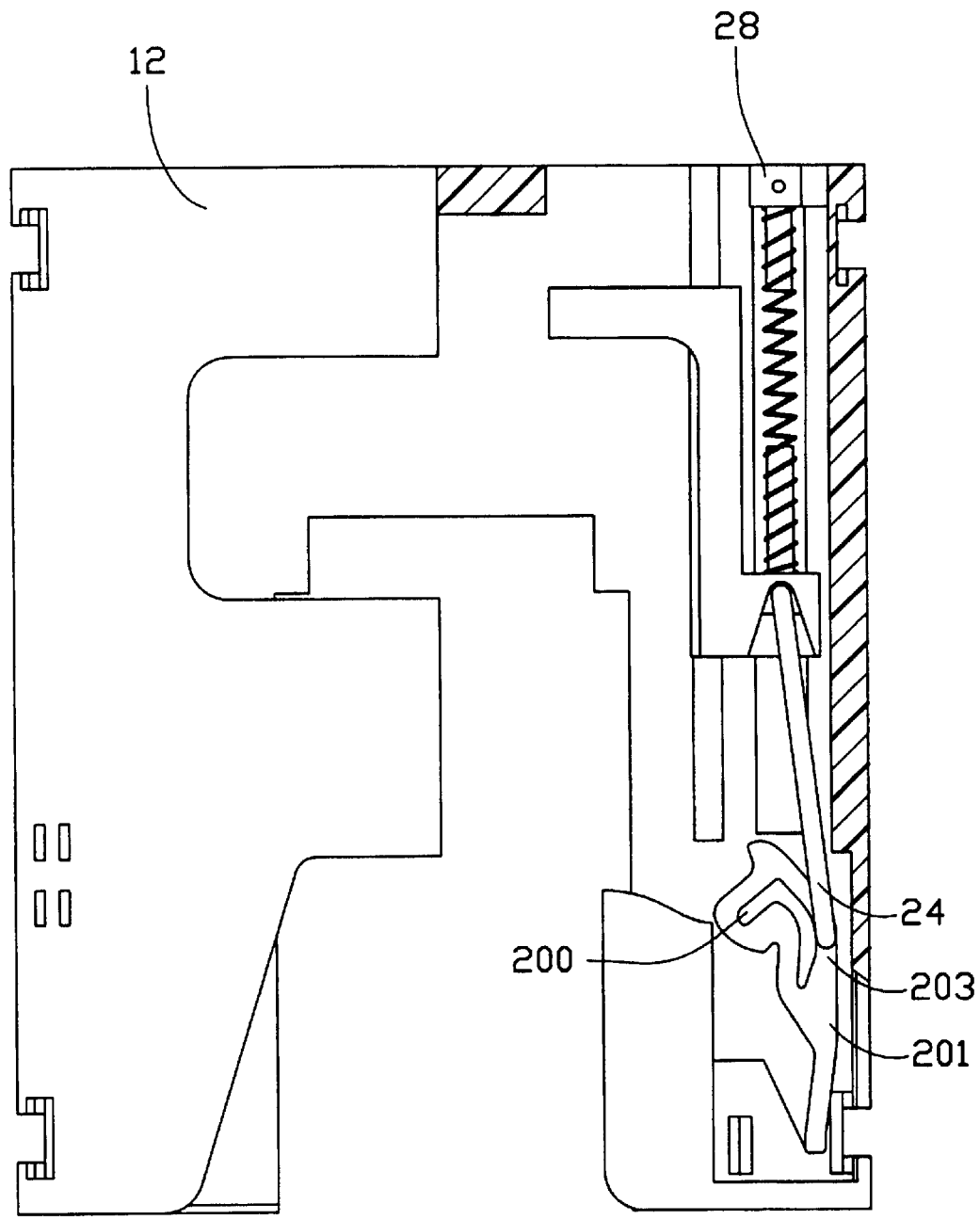
Figure 8:
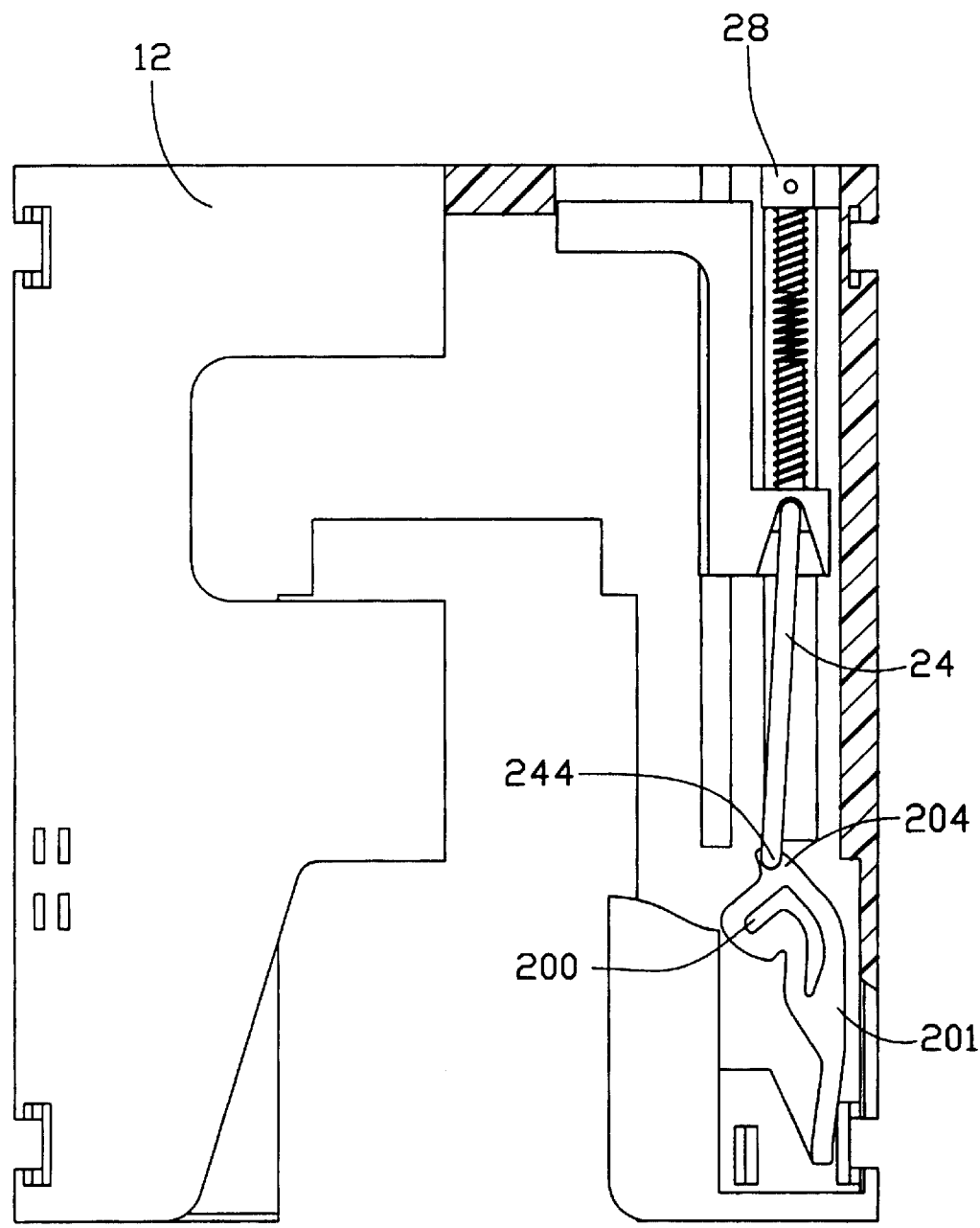
Figure 9:
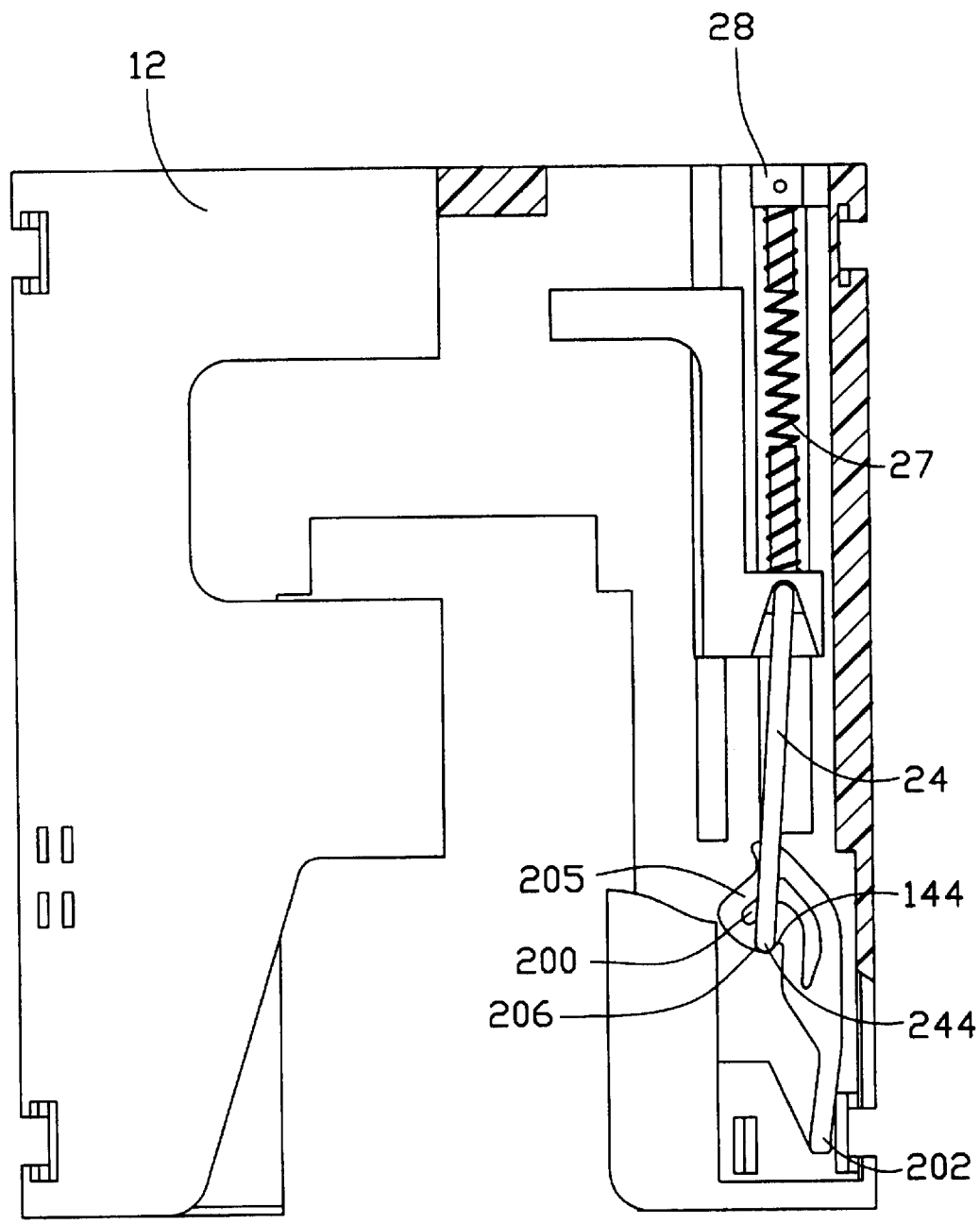
Figure 10:
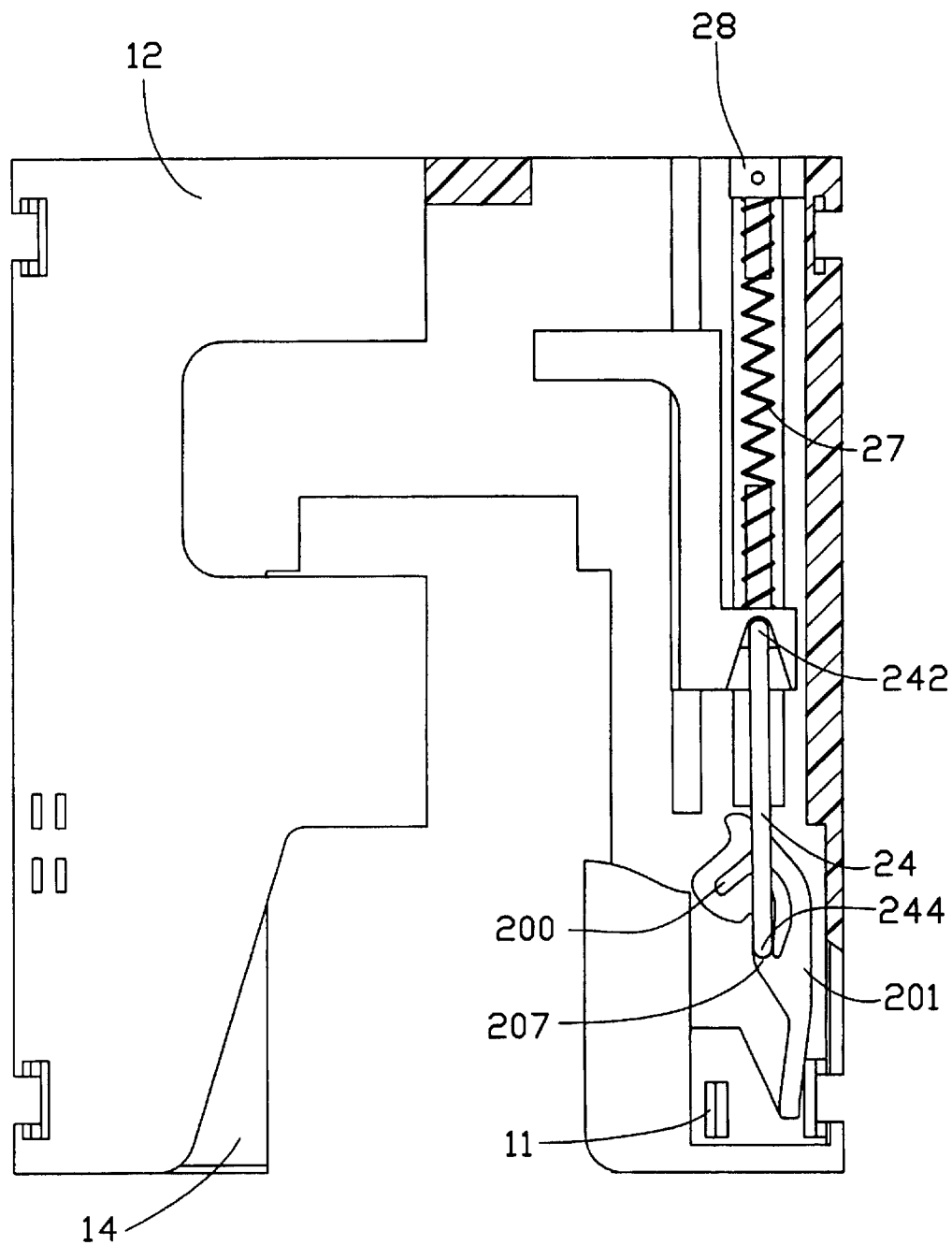

Referring to FIG. 5, the ejection mechanism 2 is received in the receiving cavity 10 of the housing 1. The flange 262 of the support arm 260 slidably engages in the guiding groove 102 of the receiving cavity 10, and the resisting arm 261 fits in the second fixing groove 108 of the receiving cavity 10. The retaining portion 28 is fitted in the first fixing groove 104. The first through hole 106 of the receiving cavity 10 is aligned with the second through hole 286 of the retaining portion 28. The locking pin 280 is inserted into the first and second through holes 106, 286. The ejection mechanism 2 is thus mounted into the housing 1. The position tab 222 of the lid 22 is inserted into the slot 162 of the stage 16 of the housing 1. The lid 22 is thus fixed in the top opening 15, and covers the guiding structure 20 to prevent the slide rod 24 from escaping from the housing 1.

FIGS. 6–10 sequentially show a track of the second end 244 of the slide rod 24 sliding in the recess 201 when the ejection mechanism 2 is in operation. When the electronic card is not inserted into the connector, the second end 244 of the slide rod 24 is retained in the tail portion 202 of the recess 201 of the housing 1. When the electronic card is inserted, the resisting arm 261 is pushed inwardly, the slide block 26 drives the second end 244 to slide in the recess 201, and the elastic element 27 is compressed. The second end 244 slides in a same direction along the recess 201 past the back portion 203 and to the top portion 204. Subsequently the second end 244 slides past the face portion 205 and into the jaw portion 206. When the electronic card is fully inserted, the second end 244 resiliently presses against the protrusion 144. When the electronic card is ejected, the electronic card is manually pushed slightly forward. The ejection mechanism 2 releases the compression of the elastic element 27. The slide block 26 is moved forwardly. The second end 244 is freed from the protrusion 144, and slides past the abdomen portion 207 to the tail portion 202. The second end 244 thus returns to its original position retained in the tail portion 202.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card ejection mechanism for an electronic card connector, comprising:

an elastic element;

a slide block connecting with the elastic element, the slide block defining a fixing opening, the slide block being moved by the card and compressing the elastic element when the card is inserted into the connector;

a slide rod having first and second ends, the first end being secured in the fixing opening of the slide block; and a guiding structure formed in a housing of the connector, the guiding structure including a recess and an arcuate island formed in a middle of the recess, a protrusion formed by the housing protruding in the recess, the second end of the slide rod being slidably fitted in the recess;

wherein when an electronic card is fully inserted, the second end resiliently presses against the protrusion;

wherein the recess of the guiding structre has a generally sea horse shaped contour.

2. The connector as claimed in claim 1, wherein the card ejection mechanism further includes a lid covering the guiding structure for preventing the second end of the slide rod from escaping from the recess.

3. The connector as claimed in claim 1, wherein the elastic element is a compression spring.

4. The connector as claimed in claim 1, wherein the card ejection mechanism further includes retaining means for securely retaining the card ejection mechanism in the housing.

5. The connector as claimed in claim 4, wherein the retaining means comprises a base and a pin, the base connecting with the elastic element such that the elastic element is disposed between the base and the slide block, the pin fitting in the housing and the base.

6. An electronic card connector comprising:

a housing defining a receiving space therein for receiving an electronic card, and further defining a receiving cavity;

a contact module secured in the housing; and ejection means received in the receiving cavity of the housing for facilitating ejection of the card, the ejection means including:

an elastic element;

a slide block connecting with the elastic element, the slide block defining a fixing opening, the slide block being moved by the card and compressing the elastic element when the card is inserted into the connector;

a slide rod having first and second ends, the first end being secured in the fixing opening of the slide block; and a guiding structure formed in the housing of the connector, the guiding structure including a recess and an arcuate island formed in a middle of the recess, a protrusion formed by the housing protruding in the recess, the second end of the slide rod being slidably fitted in the recess.

7. The connector as claimed in claim 6, wherein the housing comprises a top wall and a bottom wall, the contact module being secured in the bottom wall of the housing.

8. The connector as claimed in claim 6, further comprising a detecting device for detecting whether the card is inserted into the connector, the detecting device comprising two contacts.

9. An electrical card connector comprising:

a housing with contacts therein;

an ejection mechanism provided in the housing, said ejection mechanism including:

a sea horse like guiding structure including a recess (201) with an arcuate island (200) formed in a middle of the recess (201), said recess (201) including a tail portion (202), a back portion (203), a top portion (204), a face portion (205), a jaw portion (206) and an abdomen portion (207) together constituting a continuous cyclic path; a slide block moveable relative to the housing;

a slide rod with one end thereof receivably moving along said recess; and an elastic element constantly urging said slide block; wherein a tip of said tail portion (202) and the jaw portion (206) are two retaining positions for said end to hold said slide block in retaining positions relative to the housing; wherein said jaw portion (206) is located around a neck of a sea horse configuration of said sea horse like guiding structure, where said end of the slide rod is retainably located to define an inner position of the slide block relative to the housing, and alternately said end of the slide rod is retainably located at the tip of said tail portion (207) to define an outer position of the slide block relative to the housing;

wherein said recess is formed in the housing rather than said slide block;

wherein the other end of said slide rod is fastened to said slide block;

wherein said elastic element is a compressed coil spring urging the slide block rearwardly constantly; and wherein the end of the slide starts from the tip of the tail portion (202), through the back portion (203), the top portion (204), the face portion (205) and ends at the jaw portion (206) when said slide block moves from the outer position to the inner position relative to the housing, while starts from the jaw portion (206), via the abdomen portion (207) and ends at said tip of the tail portion (202) when said slide block moves from the inner position to the outer position.

* * * * *